United States Patent [19]

James

[11] Patent Number: 4,555,841
[45] Date of Patent: Dec. 3, 1985

[54] PIPE ALIGNING TOOL

[75] Inventor: Benny R. James, Valliant, Okla.

[73] Assignee: Alton C. Harris, Pascagoula, Miss.

[21] Appl. No.: 480,261

[22] Filed: Mar. 30, 1983

[51] Int. Cl.$^4$ .............................................. B23Q 3/00
[52] U.S. Cl. .................................. 29/468; 29/402.19; 228/175; 228/49.3
[58] Field of Search ..................... 72/458; 29/468, 237; 228/125, 446, 449 C, 173 F, 49 B

[56] References Cited

U.S. PATENT DOCUMENTS

| | | | |
|---|---|---|---|
| 654,001 | 7/1900 | Hull | 254/132 |
| 871,052 | 11/1907 | Wallace | 72/459 |
| 1,260,041 | 3/1918 | Powell | 254/129 |
| 1,940,910 | 12/1933 | Hickey | 113/102 |
| 1,985,152 | 12/1934 | Crockett | 254/131 |
| 2,252,797 | 8/1941 | Allen | 254/131 |
| 2,852,971 | 9/1958 | Macaluso | 81/15 |
| 3,181,234 | 5/1965 | Gill | 29/237 |
| 3,300,205 | 1/1967 | Fitzpatrick | 269/154 |
| 3,619,891 | 11/1971 | Harrison | 29/272 |
| 3,952,936 | 4/1976 | Dearman | 228/49 B |
| 4,011,979 | 3/1977 | Hagen et al. | 228/49 B |
| 4,016,637 | 4/1977 | Swensen | 29/281.4 |
| 4,079,493 | 3/1978 | Oygarden et al. | 29/272 |
| 4,250,769 | 2/1981 | Herring | 74/525 |

FOREIGN PATENT DOCUMENTS 494101 6/1982 Fed. Rep. of Germany .
305322 6/1971 U.S.S.R. .

Primary Examiner—Howard N. Goldberg
Assistant Examiner—John T. Burtch
Attorney, Agent, or Firm—Dunlap, Codding & Peterson

[57] ABSTRACT

A tool for aligning pipes to be secured in an end-to-end relationship which includes a strap to be secured around the end of one pipe and a lever engaging the strap, the lever having a foot to engage and deform a portion of the other pipe.

5 Claims, 2 Drawing Figures 4,555,841

PIPE ALIGNING TOOL

BACKGROUND OF THE INVENTION

1. Field of the Invention

The present invention relates generally to the field of pipe alignment and particularly, but not by way of limitation, to a hand operated tool for completing the alignment of pipes partially secured in an end-to-end relationship.

2. Description of Prior Art

The following U.S. Patents are, to the inventor's knowledge, the more generally pertinent prior art relating to the present invention.

U.S. Pat. No. 3,300,205, issued to Fitzpatrick, describes a pipe aligning tool where the at least partially abutting ends of two pipes are forced into a set of jaws by rotation of a handle for end-to-end alignment prior to welding.

U.S. Pat. No. 3,619,891, issued to Harrison, describes a pipe clamp for aligning pipes using adjusting screws and aligning blocks mounted upon a roller chain for enclosing and clamping abutting pipe ends.

U.S. Pat. No. 4,016,637, issued to Swensen, describes a method and apparatus for alignment of pipes to be securedly abutted. A clamping chain holding funnel-like guides is mounted on the end of the first pipe. When the second pipe is lowered or forced into abutting contact, the pre-positioned guides act to align it correctly with the first pipe.

SUMMARY OF THE INVENTION

A pipe aligning tool usable to align and conform the ends of a first pipe and second pipe partially secured in an abutting end-to-end relationship for completion of their being secured. The tool comprises a lever having opposite ends and whose first end is strapped to the first pipe near but axially spaced from the pipe-end at position opposing a section of the second pipe-end having a protrusion not aligned with the end of the first pipe. The lever is designed to press the protrusion of the second pipe-end to align with the end of the first pipe when force is applied to the second end of the lever.

DESCRIPTION OF THE PREFERRED EMBODIMENT

Figure 1:
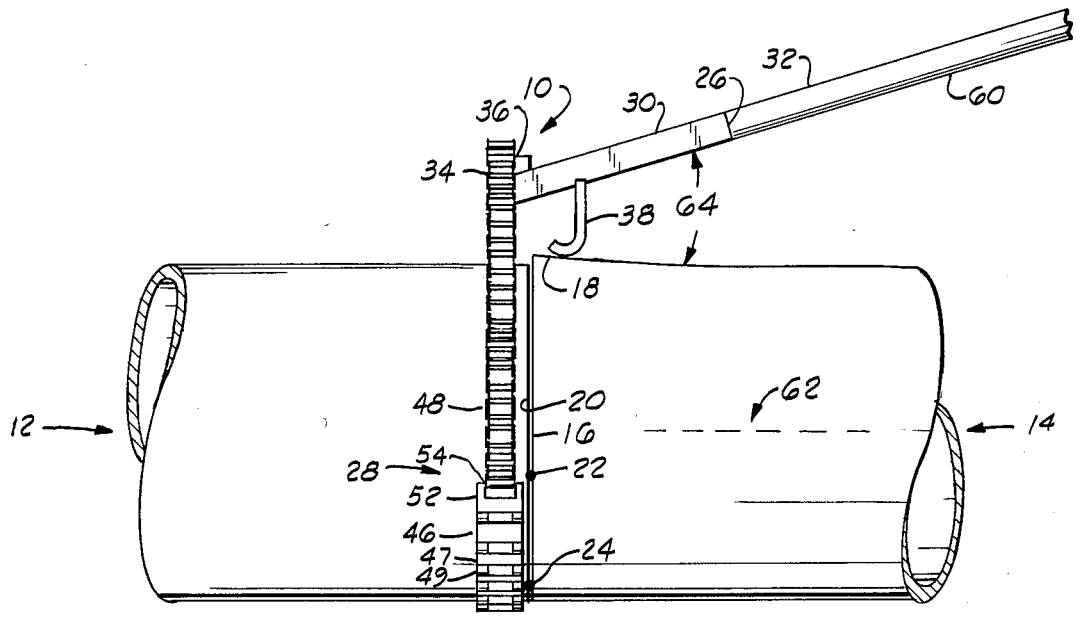
FIG. 1 is a side elevational view of the aligning tool in operating position.
Figure 2:
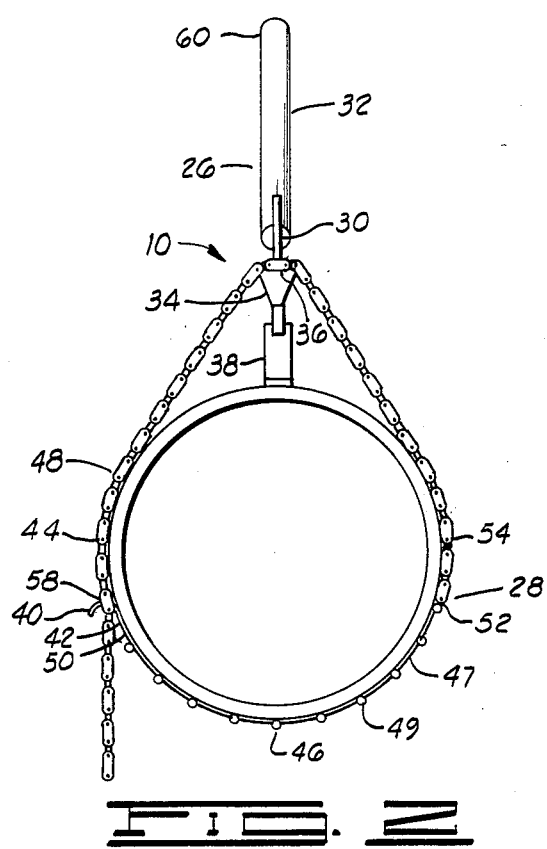
FIG. 2 is an end elevational view of the aligning tool in operating position.

Referring to the drawings in detail, and particularly FIG. 1, reference character 10 generally designates the pipe aligning tool mounted on the adjacent ends of pipes 12 and 14 which are to be secured together, as by welding.

The first pipe 12 and the second pipe 14 are of equal diameter and circular shape when manufactured. In many cases, however, upon shipment and handling, the shape of certain relatively thin-walled pipes, especially at an end, loses its circularity to become ovoid, at least in part. When joining pipes in an end-to-end relationship, especially by welding, the abutting ends must substantially match in size and shape. As illustrated for an example in FIG. 1, the end 16 of the second pipe 14 has an ovoid protrusion 18 which does not properly abut with the corresponding end 20 of the first pipe 12.

To correct this improper abutment, the pipe aligning tool 10 is utilized.

However, before utilizing the pipe aligning tool 10, sections of the end 20 of the first pipe 12 and the end 16 of the second pipe 14, which are in alignment, are secured, preferably by tack welds 22, 24.

The pipe aligning tool 10 comprises a lever 26 and a strap 28 both of which have opposite ends. The lever 26 has a lower portion 30 and an upper portion 32. The lower portion 30 of the lever 26 is preferably constructed of a rectangular bar and the upper portion 32 of a round bar, both of which are preferably constructed of metal.

The lever 26 has a first end 34, this also being the first end of the lower portion 30. Secured upon the first end 34 of the lever 26 is a strap engaging pad 36. The lower portion 30 of the lever 26 has a perpendicularly disposed foot 38 connected near but axially spaced from the first end 34. The foot 38 is preferably a j-shaped plate, constructed of metal.

The strap 28 has a hook 40 attached to the first strap end 42. Each of a plurality of perforations extending from the second strap end 44 is adapted to engage the hook 40 so that the strap 28 may be hooked to encompass different shapes and diameters.

The strap 28 preferably is constructed of a hinged plate portion 46 and a chain portion 48, each having opposite ends. The hinged plate portion 46, preferably comprising metallic plates 47 connected by hinges 49, is utilized as being well adapted to distribute force evenly about a large portion of the first pipe during the operation of the pipe aligning tool 10 which is later described. The chain portion 48 is utilized as being well adapted to fittingly engage the strap engaging pad 36 during the operation of the pipe aligning tool 10 which is later described.

The hinged plate portion 46 has the hook 40 attached to the first plate end 50, this also being the first strap end 42 described earlier. The second plate end 52 of the hinged plate portion 46 is connected to the first chain end 54 of the chain portion 48.

The chain portion 48 of the strap 28 is preferably a doubled link chain of the type commonly driven by a sprocket. Extending axially from the second chain end 56 (also the second strap end 44) is the plurality of perforations, each of which is adapted to engage the hook 40.

To initiate use of the pipe aligning tool 10 with the pipes 12, 14, partially secured by tack welds 22, 24, the strap 28 is first passed around the first pipe 12, near but axially spaced from the end 20 of the pipe 12.

The hook 40 is then engaged in a perforation 58 so that the engaged strap 28 has a larger circumference than the pipe 12 to permit the later insertion of the lever 26 therebetween. The chain portion 48 is positioned so that the center of the chain portion 48 between the perforation 58 and the first chain end 54 is generally aligned with the ovoid protrusion 18 in the end 16 of the second pipe 14.

With the strap 28 thus hooked and positioned, the first end 34 of the lever 26 is inserted between the chain portion 48 and the pipe 12 so that the foot 38 of the lever 26 is positioned upon the ovoid protrusion 18 in the end 16 of the second pipe 14 and the strap engaging pad 36 engages the chain portion 48 of the strap 28.

When the second end 60 of the positioned lever 26 is moved toward the axis 62 of the second pipe 14 until the strap 28 is taut, the lever 26 extends at an angle 64 generally away from the second pipe 14. The application of further force to move the second end 60 of the lever 26 toward the axis 62 of the second pipe 14 is then continued, for example by hand, until the foot 38 presses the ovoid protrusion 18 into alignment with the end 20 of the first pipe 12.

The lever 26 and the strap 28 of the pipe aligning tool 10 are then removed and the now aligned pipe ends 16, 20 are completely secured, such as by welding.

Changes may be made in the parts, elements and assemblies described herein or in the steps or the sequence of steps of the method described herein without departing from the concept and scope of the invention as described in the following claims.

What is claimed is:

1. A pipe aligning tool for alignment of incompletely aligned ends of a first pipe and a second pipe in a partially secured abutting end-to-end relationship, to facilitate completion of their being secured together, comprising:
   a lever having first and second opposite ends;
   means for strapping the first end of said lever to the first pipe near but axially spaced from the end of the first pipe at a position opposing a section of the second pipe having a protrusion not aligned with the end of the first pipe; and
   means, rigidly fixed to the lever near the first end of the lever, for pressing the protrusion of the second pipe into alignment with the end of the first pipe by applying a force to the second end of the lever.

2. The pipe aligning tool of claim 1 wherein the lever is defined further as having a first end with a strap engaging pad and wherein the means for strapping the first end of said lever to the first pipe is defined further as comprising a strap having a first end and a second end, with a hook connected to the first strap end of said strap and a plurality of perforations extending from the second strap end to engage the hook whereby the strap is positioned to encompass the first pipe and the strap engaging pad and the hook is engaged in a perforation to strap the first end of said lever to the first pipe.

3. The pipe aligning tool of claim 2 wherein the means for pressing the protrusion of the second pipe is defined further as a perpendicularly disposed foot near but axially spaced from the first end of said lever whereby applying the force to the second end of the lever can force the foot to press the protrusion of the second pipe until the end of the second pipe is aligned with that of the first pipe.

4. The pipe aligning tool of claim 3 wherein the strap is defined further as comprising a hinged plate portion and a chain portion, each having a first end and a second end, and wherein the plate portion is defined further as comprising plates connected by hinges, the hook being connected to the first plate end and the second plate end being connected to the first chain end of the chain portion; the chain portion being defined further as fittingly engagable with the strap engaging pad, and as having a plurality of perforations extending from the second chain end for engaging the hook.

5. A method of completing the end-to-end alignment of a similarly sized first pipe and second pipe, the second pipe-end having been bent to have a protrusion, non-aligning with the first pipe-end, the method using a lever having a first end and a second end, with a perpendicularly disposed foot near but axially spaced from the first lever-end, the method comprising the steps of:
   partially securing the first pipe-end to the second pipe-end at points which are aligning;
   strapping the first end of the lever to the first pipe near the first pipe-end at a point corresponding to the protrusion of the second pipe-end, so tht the foot is aligned with the protrusion; and
   applying a force to the second end of the lever to press the protrusion into alignment with the first pipe-end.

* * * * *